United States Patent [19]
Finkowski

[11] Patent Number: 6,003,417
[45] Date of Patent: Dec. 21, 1999

[54] INDEXER FOR MOVING FOOD ALONG A PROCESSING LINE IN A PRECISE MANNER

[75] Inventor: James W. Finkowski, Andover, Minn.

[73] Assignee: The Pillsbury Company, Minneapolis, Minn.

[21] Appl. No.: 08/872,350

[22] Filed: Jun. 10, 1997

Related U.S. Application Data

[63] Continuation of application No. 08/461,303, Jun. 5, 1995, abandoned.

[51] Int. Cl.⁶ ........................................................ B26D 7/06
[52] U.S. Cl. .................................. 83/76; 83/279; 83/367; 83/155
[58] Field of Search .................................. 83/155, 74, 76, 83/410, 411.1, 423, 110, 923, 53, 177, 452, 460.61, 465, 279, 282, 367, 236, 262, 932, 456; 425/289, 308, 329

[56] References Cited

U.S. PATENT DOCUMENTS

| | | |
|---|---|---|
| Re. 22,875 | 5/1947 | Grimm et al. . |
| 1,304,104 | 5/1919 | Schiller . |
| 1,317,690 | 10/1919 | Fewell ........................................ 83/420 |
| 1,514,848 | 11/1924 | Gantz . |
| 1,534,768 | 4/1925 | Brown ...................................... 425/329 |
| 2,008,111 | 7/1935 | Schmitt ...................................... 83/282 |
| 2,545,667 | 3/1951 | Malnati . |
| 2,619,051 | 11/1952 | Rice . |
| 2,965,050 | 12/1960 | Doering .................................. 425/308 |
| 3,602,156 | 8/1971 | Verboeven ................................. 107/27 |
| 3,747,456 | 7/1973 | Kochinashvili et al. .................. 83/461 |
| 3,897,189 | 7/1975 | Thompson ........................... 425/324 R |
| 4,057,456 | 11/1977 | Renegar et al. ......................... 156/515 |
| 4,147,081 | 4/1979 | Pellaton ..................................... 83/407 |
| 4,207,044 | 6/1980 | Lionello .................................... 425/126 |
| 4,266,920 | 5/1981 | Hayashi et al. ....................... 425/133.1 |
| 4,416,910 | 11/1983 | Hayashi et al. .......................... 426/502 |
| 4,428,263 | 1/1984 | Lindee et al. ............................. 83/367 |
| 4,647,467 | 3/1987 | Pinto ........................................ 426/502 |
| 4,735,566 | 4/1988 | Squicciarini ............................... 83/177 |
| 4,809,575 | 3/1989 | Swanson ................................... 83/152 |
| 5,099,979 | 3/1992 | Kehrel ...................................... 83/420 |
| 5,146,822 | 9/1992 | Noda et al. ............................... 83/906 |
| 5,149,594 | 9/1992 | Lewandowski et al. ................ 426/503 |
| 5,201,259 | 4/1993 | Covert et al. ............................. 83/932 |
| 5,228,554 | 7/1993 | Kuchta et al. ........................... 198/635 |
| 5,286,185 | 2/1994 | Tashiro et al. ............................ 83/932 |
| 5,306,133 | 4/1994 | Dayley ..................................... 83/932 |
| 5,562,008 | 10/1996 | Lordo ....................................... 83/367 |

FOREIGN PATENT DOCUMENTS

| | | |
|---|---|---|
| 2 195 892 | 2/1974 | France . |
| 2195892 | 2/1974 | France . |
| 2 401 079 | 8/1978 | France . |
| 43 38 232 A1 | 11/1995 | Germany . |

*Primary Examiner*—Rinaldi I. Rada
*Assistant Examiner*—T. Anthony Vaughn
*Attorney, Agent, or Firm*—Westman, Champlin & Kelly, P.A.

[57] ABSTRACT

A dough processing machine includes a first conveyor having an inlet end and an outlet end. The first conveyor is disposed to convey dough along a dough travel path in a direction downwardly offset from a generally horizontal line. A cutter is disposed at the outlet end of the first conveyor to cut the dough. First and second, generally opposed, movable supports are disposed relative to the dough travel path to support the dough along the dough travel path.

18 Claims, 3 Drawing Sheets

INDEXER FOR MOVING FOOD ALONG A PROCESSING LINE IN A PRECISE MANNER

This is a continuation of application Ser. No. 08/461,303, filed Jun. 5, 1995 now abandoned. Priority of the prior application is claimed pursuant to 35 USC § 120.

BACKGROUND OF THE INVENTION

The present invention relates to a machine for processing food products. More particularly, the present invention relates to a machine for moving a food product along a processing line.

Food processing equipment, such as dough processors, are known. Similarly, conventional equipment exists for forming a rolled dough product. Such equipment typically provides a sheet of dough on a conveyor. Filling is applied to the sheet of dough and the dough is rolled with rolling equipment, such as Torpedo rollers. The rolled dough is provided as a continuous rolled dough cylinder, to a cutting apparatus which cuts the rolled dough cylinder to form a plurality of rolled dough pieces, each of which has filling rolled therein. The individual rolled dough pieces are provided to a packaging apparatus which packages the rolled dough pieces in cans or other suitable packages.

Conventional cutting machines have included guillotine-type cutters. This type of cutter has a knife which is moved in a reciprocating manner as the dough cylinder travels beneath the knife. The knife cuts the dough into individual rolled dough pieces which are moved by an outfeed conveyor to the packaging machine.

Some rolled dough products (or other food products) are fairly light weight, and are extremely soft. Therefore, as the cylinder of dough moves along the processing line, it can move about on the conveyor causing difficulty during the cutting operation. In addition, when the cylinder of dough is unsupported, the guillotine-type cutter tends to smash or flatten the dough pieces as they are cut.

Further, in conventional dough processing equipment, the dough is moved continuously as it is cut. This can result in the dough pieces cut from the cylinder being wedge-shaped. In other words, since the dough is moving continuously, the guillotine cutter essentially cuts at an angle across the cylinder of dough resulting in a wedge-shaped piece. This wedge-shaped piece can present problems in packaging.

Also, in conventional dough processing equipment, the guillotine cuts the dough on a flat, substantially horizontal surface. Thus, after the dough is cut into individual pieces, the pieces do not always lay down flat on the outfeed conveyor. This can also cause problems during packaging. If the dough products are not lying flat on the outfeed conveyor, they must be manually repositioned on the conveyor so that they are lying flat. However, since many rolled dough products are extremely soft, it is very difficult to manually handle the dough while still maintaining desired physical integrity.

Others have attempted to solve this problem with declining dough feeders. However, with these machines, the dough was clamped or instantaneously stopped prior to, and during the cutting operation while the conveyor continued to advance. Thus, the dough cylinder slipped against the drive conveyor and resulted in cutting problems and undesirable product characteristics.

SUMMARY OF THE INVENTION

A dough processing machine includes a first conveyor having an inlet end and an outlet end. The first conveyor is disposed to convey dough along a dough travel path in a direction downwardly offset from a generally horizontal line. A cutter is disposed at the outlet end of the first conveyor to cut the dough. First and second, generally opposed, movable supports are disposed relative to the dough travel path to support the dough along the dough travel path.

DETAILED DESCRIPTION OF THE PREFERRED EMBODIMENTS

Figure 1:
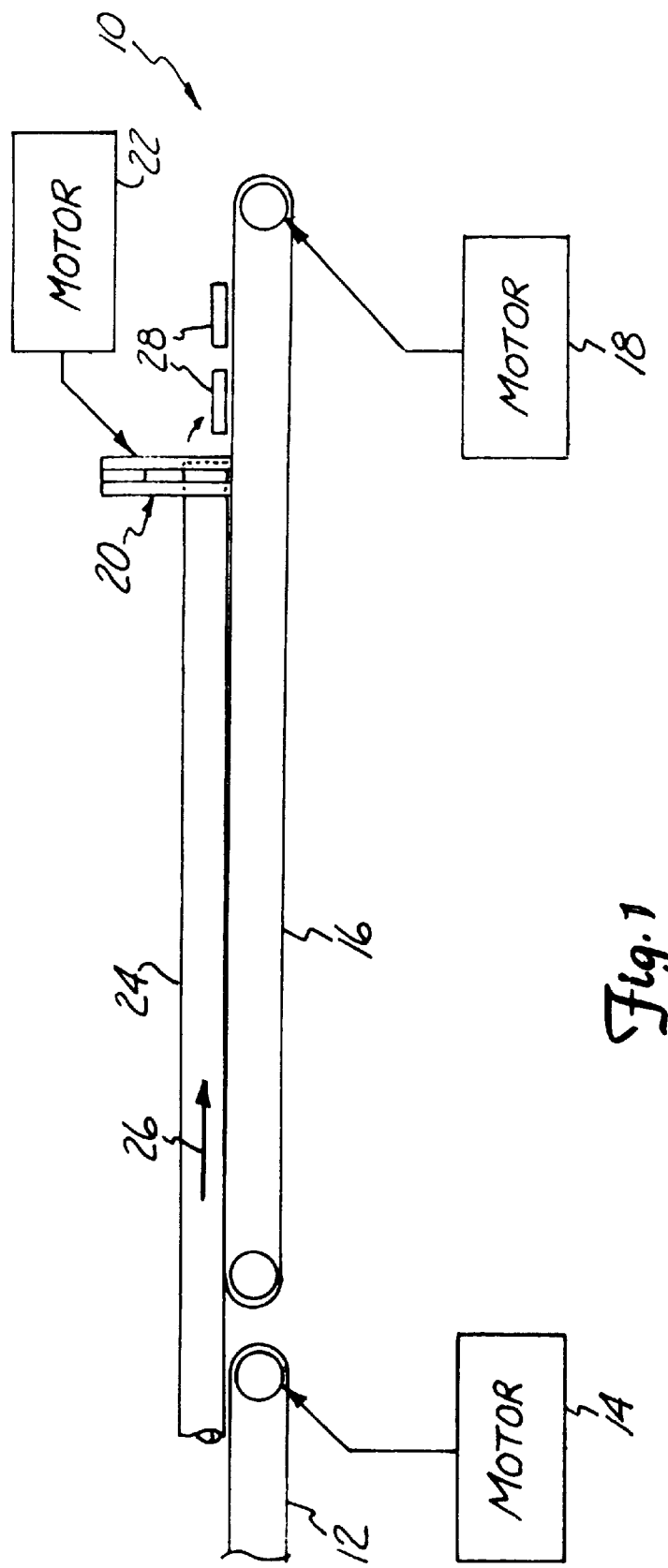
FIG. 1 is an illustration of a dough cutter, in partial block diagram form, according to the prior art.

FIG. 1 illustrates a conventional conveyor system 10 used in advancing a rolled dough product along a processing line. System 10 includes preparation table conveyor 12, motor 14, cutter conveyor 16, motor 18, cutter 20 and motor 22.

Preparation table conveyor 12 provides the food being prepared or processed to conveyor 16. In the embodiment illustrated in FIG. 1, the food being prepared is a rolled dough product. In that instance, preparation table conveyor 12 provides a generally cylindrical roll of dough 24 along a dough travel path, generally indicated by arrow 26 to conveyor 16.

The preparation table portion of the processing line varies depending on the particular dough or other food product being processed. However, to process a rolled dough product, the preparation table would typically include dough extrusion and reduction equipment which extrudes a sheet of dough suitable for processing. The reduction equipment typically rolls, or reduces, the sheet of dough to a desired thickness in a desired number of layers. Other known equipment may also be used in the preparation table to provide a dough sheet suitable for receiving filling. The filling is then applied to the dough sheet and the dough sheet is rolled, typically using Torpedo rollers, into dough cylinder 24.

Conveyor 12 is driven by motor 14, and conveyor 16 is driven by motor 18. Motors 14 and 18 are typically driven at the same speed to continuously drive dough cylinder 24 along path 26.

Conveyor 16 moves dough cylinder 24 toward cutter 20 which, in the embodiment shown in FIG. 1, is a guillotine-type cutter. The blade in cutter 20 is driven by motor 22 in a reciprocating manner to cut pieces 28 from dough cylinder 24. It is desired that, once pieces 28 are cut from dough cylinder 24, they lay down flat on conveyor 16, as shown in FIG. 1. However, since dough cylinder 24 is moved in a substantially horizontal direction, pieces 28 do not always lay flat on conveyor 16. This can cause problems during packaging or other subsequent dough processing actions.

Further, motor 18 drives conveyor 16 at a constant speed so cylinder 24 is continuously advanced along path 26. This can result in cutter 20 cutting through cylinder 24 at an angle to produce wedge-shaped pieces. These irregularly shaped pieces can also cause problems during packaging.

Figure 2:
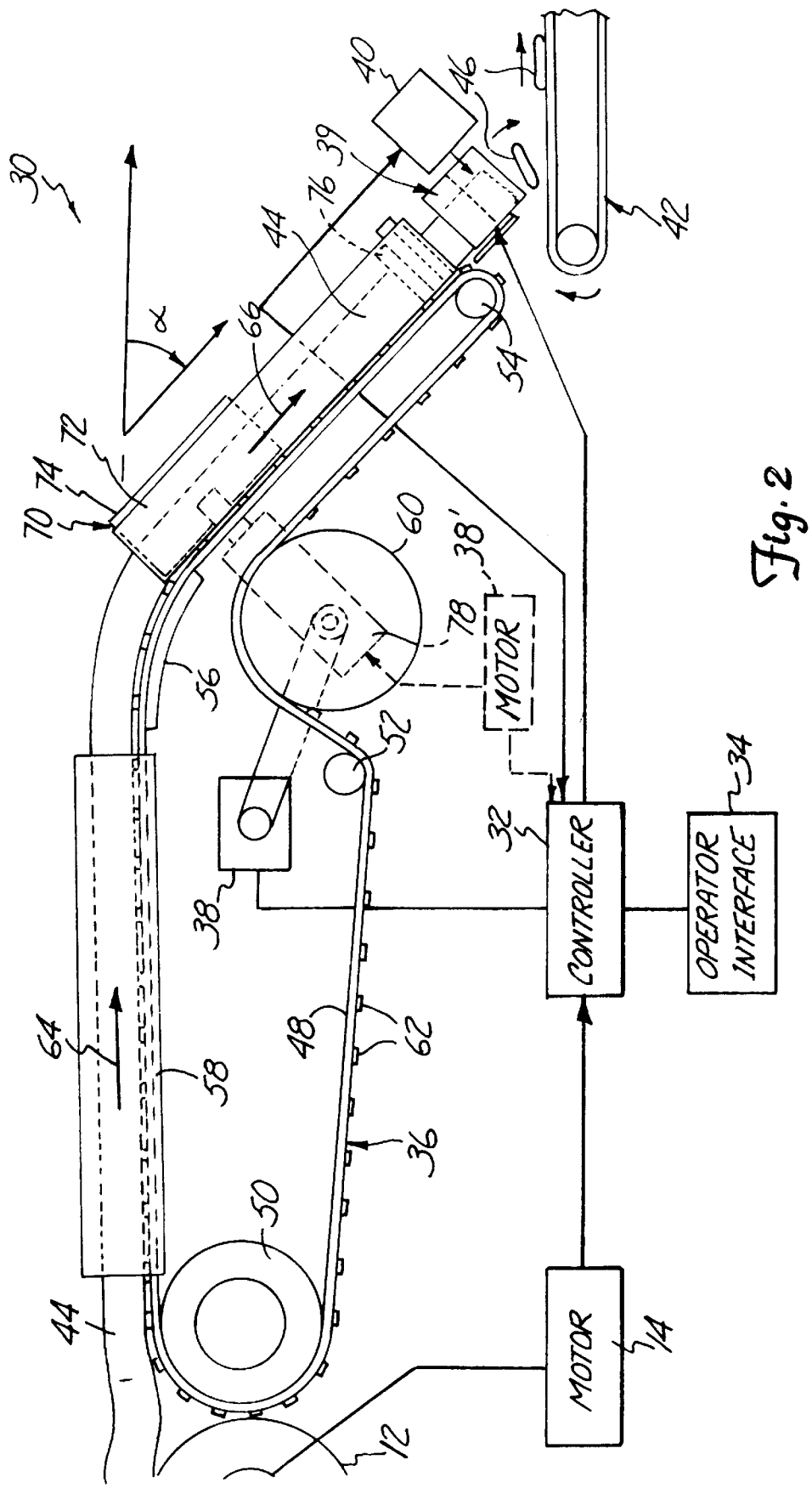
FIG. 2 is a side view of a dough indexing machine, in partial block diagram form, according to the present invention.
Figure 3:
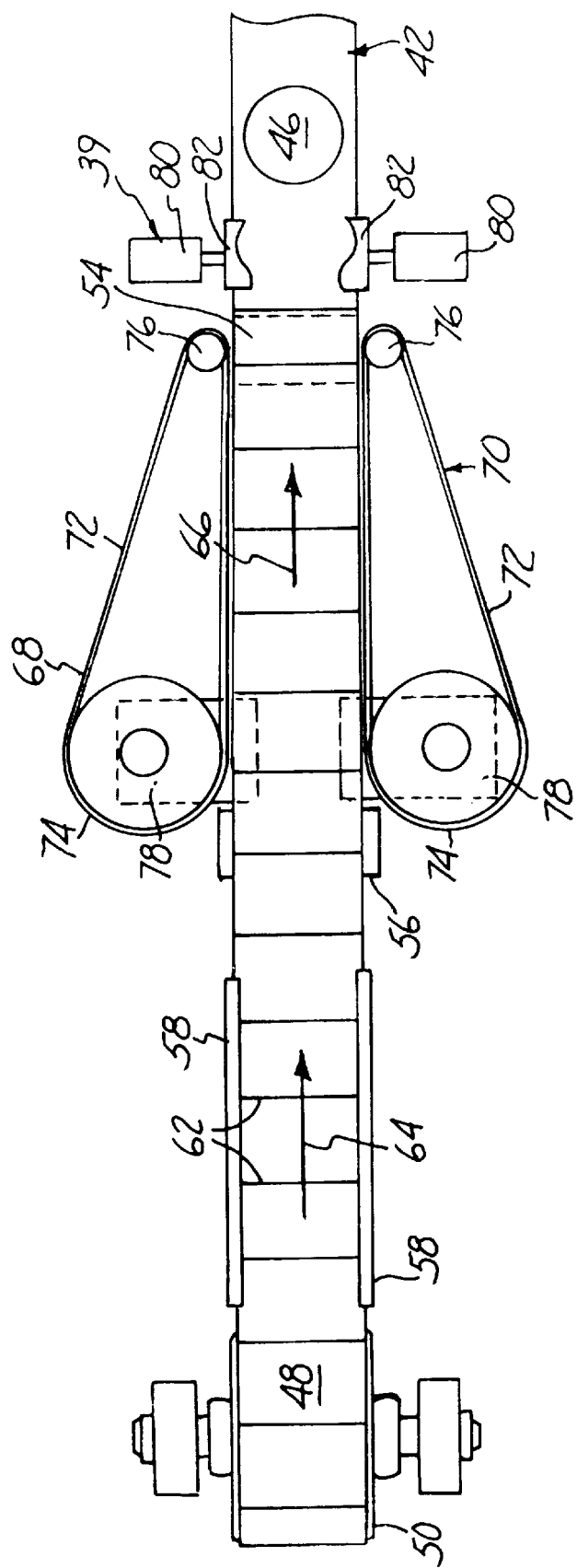
FIG. 3 is a top view of a portion of the dough indexing machine shown in FIG. 2.

FIGS. 2 and 3 illustrate a dough indexing, or conveying, system 30 according to the present invention. FIG. 2 is a side view (shown in partial block diagram form) of system 30, and FIG. 3 is a top view of a portion of system 30. System 30 includes controller 32, operator interface 34, continuous index conveyor assembly 36, motor 38, and clamping mechanism 39. System 30 is also shown positioned relative to preparation table conveyor 12, cutter 40 and outfeed conveyor assembly 42.

In the preferred embodiment, controller 32 is a digital computer, microprocessor, microcontroller, or other suitable controller for controlling operations of system 30. Operator interface 34 is coupled to controller 32 and preferably includes an operator display, as well as an operator input device, such as a keyboard, one or more switches, a membrane keypad, or other suitable operator input device.

Controller 32 receives a speed output from motor 14 indicating the speed at which motor 14 is advancing preparation table conveyor 12. In response to the speed signal from motor 14, controller 32 controls motor 38 to advance conveyor assembly 36 and to move dough cylinder 44 to cutter 40. Clamping mechanism 39 securely holds dough cylinder 44 proximate cutter 40. Cutter 40 then cuts dough pieces 46 which lay down on outfeed conveyor 42 and are transported to other processing equipment, such as a packaging machine.

In the preferred embodiment, index conveyor assembly 36 includes a continuous conveyor belt 48 supported by a plurality of rollers 50, 52 and 54 and a plurality of guides, 56 and 58. Belt 48 is driven by drive roller 60 and has a plurality of spaced cleats 62 affixed thereto. Cleats 62 are preferably simply transversely arranged plastic protrusions affixed to, or formed integrally with, belt 48. Cleats 62 provide greater positive traction in driving dough cylinder 44.

Belt 48 is arranged so that it first moves dough cylinder 44 along a substantially horizontal dough travel path 64 from conveyor 12. Belt 48 then drives dough cylinder 44 in a downward direction along a downward dough travel path 66. Dough travel path 66 is offset, in the downward direction, from a generally horizontal line, by an angle $\alpha$. In the preferred embodiment, $\alpha$ is equal to approximately 45°. However, any downward angle is advantageous.

As dough cylinder 44 moves along dough travel path 66 (in the downward direction) dough cylinder 44 is supported by a pair of generally opposed support belt assemblies 68 and 70. Assemblies 68 and 70 support dough cylinder 44 to avoid dough cylinder 44 from stretching under the influence of gravity, and also to provide more precise positioning of dough cylinder 44 during the cutting operation.

In the preferred embodiment, assemblies 68 and 70 each include a continuous belt 72 which rotates about a drive roller 74 and an idler roller 76. A pair of right angle gear boxes 78 are attached to the pulley driving roller 60. The right angle gear boxes 78 are operably coupled to drive rollers 74 to provide the driving input to assemblies 68 and 70. The pulleys driving belt 48 and belts 72 are the same size. Therefore, belts 72 are driven at precisely the same speed as belt 48. This substantially eliminates any stretching or gathering of dough cylinder 44 as it moves throughout assembly 36.

FIG. 3 also better illustrates clamping mechanism 39. Clamping mechanism 39 preferably includes a pair of actuable air cylinders 80 which are operably coupled to a pair of generally opposing clamping members 82 (any other suitable power actuators, such as linear servo motors, can also be used). Controller 32 controls cylinders 80 to extend and thus cause clamping members 82 to engage dough cylinder 44 just prior to the cutting operation. In this way, dough cylinder 44 is securely held in place during the cutting operation to provide for cleaner and more accurate cutting of dough pieces 46, and to substantially prevent dough cylinder 44 from becoming displaced during the cutting operation. In the preferred embodiment, clamping members 82 are plastic pieces formed generally in a crescent shape to engage dough cylinder 44.

In operation, controller 32 advances belt 48 in indexing assembly 36 in a step-wise, or indexed, fashion. Conveyor 12 continuously advances dough cylinder 44, at a constant rate. A signal indicative of this rate is provided by motor 14 to controller 32. When controller 32 determines that conveyor 12 has advanced a predetermined distance (in the preferred embodiment, the predetermined distance is approximately ⅜ of an inch), controller 32 causes motor 38 to advance belt 48 by that exact same predetermined distance (e.g., ⅜ of an inch) and then stop or dwell for a short period of time. In advancing belt 48, right angle gear boxes 78 also cause rollers 74 to advance belts 72 by ⅜ of an inch. After dough cylinder 44 has been advanced by the desired amount through assembly 36 and brought to a stop, controller 32 actuates cylinders 80 so that clamping members 82 securely hold dough cylinder 44 proximate cutting mechanism 40. Then, depending upon the type of cutting mechanism 40 used in system 30, controller 32 may actuate cutting mechanism 40 to cut a dough piece 46 from dough cylinder 44.

In the preferred embodiment, cutting mechanism 40 includes a water knife cutter which is mounted on slides and driven by a servo motor along the slides in a direction transverse to dough travel path 66 in order to cut dough cylinder 44. Controller 32 controls the servo motor which drives the water knife in the transverse direction. Once controller 32 has indexed dough cylinder 44 forward along the dough travel path, controller 32 causes the motor to advance the water knife across dough cylinder 44 to cut a piece 46.

However, cutter 40 could also be any other type of suitable cutter, such as a spiral blade. In an embodiment in which a spiral blade is used, the spiral blade is continuously rotated at a desired speed. A position (or proximity) switch is implemented which detects the angular position of the spiral blade. When the spiral blade is in a proper angular position, controller 32 causes assembly 36 to index the dough cylinder 44 forward, through the gap in the spiral blade. The spiral blade then cuts a dough piece 46 from dough cylinder 44.

Since conveyor 12 is continuously advancing dough cylinder 44, and since assembly 36 intermittently advances dough cylinder 44, a small space is provided between conveyor 12 and assembly 36. This allows dough cylinder 44 to gather, slightly, between conveyor 12 and assembly 36. However, since the distance that dough cylinder 44 travels between actuations of assembly 36 is quite small (on the order of an inch or less) there is substantially no stretching or thickening of dough cylinder 44 during the dwell time period. Rather, dough cylinder 44 simply drops slightly in the gap between conveyor 12 and assembly 36.

It should be noted that, in the preferred embodiment, motor 38 is preferably a servo motor. However, motor 38 could also be a stepper motor, or another type of motor suitable for accurately advancing belt 48 in assembly 36. Also, a mechanical indexer could be used as well.

It can be seen from the above description that a great deal of accuracy in advancing dough cylinder 44 is highly desirable. Further, securing dough cylinder 44 prior to the cutting operation is also highly desirable. In addition, the capability of stopping dough cylinder 44 intermittently during the cutting operation yields significant advantages.

The present invention, by providing indexed positive driving and support on three sides of dough cylinder 44 (particularly along dough travel path 66) allows system 30 to very accurately drive and position dough cylinder 44 prior to the cutting operation. The positive driving capabilities allow dough cylinder 44 to be moved by a precisely controlled distance so that dough pieces 46 are accurately obtained.

Further, in the preferred embodiment of the present invention, dough travel path 66 is placed at a downward angle, off-set from a generally horizontal line. This position promotes desirable motion of dough pieces 46 once they are cut from dough cylinder 44. The dough pieces lay down flat on outfeed conveyor 42, thereby enhancing the packaging operations and reducing the need for manual manipulation of dough pieces 46.

It should also be noted that belts 72 on side support assemblies 68 and 70 can also be cleated to provide additional positive driving traction. This may be desirable, depending upon the particular food item being processed.

Further, while the present description has proceeded substantially with respect to the processing of rolled dough products, any number of other food items can be positioned for manipulation according to the present invention. The present invention may be used to position other continuously fed food items, such as cheese, for cutting and packaging.

Although the present invention has been described with reference to preferred embodiments, workers skilled in the art will recognize that changes may be made in form and detail without departing from the spirit and scope of the invention.

What is claimed is:

1. A dough processing machine, comprising:
    a first conveyor having an inlet end and an outlet end and a movable endless conveying surface between the inlet and outlet and being disposed to convey dough along a dough travel path;
    a cutter disposed at the outlet end of the first conveyor to cut the dough;
    first and second, generally opposed, movable supports supported on opposed sides of the conveying surface of the first conveyor, having first and second support surfaces, respectively, which are movable in a direction generally parallel to the dough travel path, the first and second movable supports being arranged such that the first and second support surfaces are positioned between the inlet end and the outlet end of the first conveyor and relative to the dough travel path to support opposing sides of the dough as the dough moves along the dough travel path;
    an infeed conveyor having a first and second end, the infeed conveyor and first conveyor being supported in end to end relation to convey a continuous elongated dough cylinder from the second end of the infeed conveyor to the inlet of the first conveyor;
    an infeed conveyor drive assembly coupled to the infeed conveyor;
    a first conveyor drive assembly coupled to the first conveyor;
    a controller coupled to the infeed conveyor and the first conveyor and configured to control the first conveyor to convey the dough at a speed based on a speed of the infeed conveyor; and the first and second movable supports being synchronously coupled to the first conveyor and driven substantially synchronously with the first conveyor; and
    the infeed drive assembly continuously operating the infeed conveyor to convey the dough at a substantially constant rate, and the controller being configured to control the first conveyor drive assembly to move the first conveyor in intermittent steps to convey the dough in intermittent steps, the cutter cutting the dough between intermittent steps, and the rate at which the intermittent steps are taken is determined based on the constant rate of the infeed conveyor.

2. The dough processing machine of claim 1 wherein the first movable support comprises a first continuous support conveyor and wherein the second movable support comprises a second continuous support conveyor.

3. The dough processing machine of claim 2 and further comprising:
    a motor coupled to the controller, the first conveyor and the first and second support conveyors to drive the first conveyor and the first and second support conveyors in response to a control signal from the controller, the controller providing the control signal based on the constant rate of the infeed conveyor.

4. The dough processing machine of claim 1 wherein the first conveyor comprises:
    a continuous belt conveyor having a continuous belt and a plurality of cleats disposed on the continuous belt for engaging the dough.

5. The dough processing machine of claim 1 wherein the first conveyor is configured to convey the dough from the inlet end first along a generally horizontal dough travel path and then in a direction generally downwardly offset from a horizontal line to the outlet end.

6. The dough processing machine of claim 1 and further comprising:
    a clamp disposed proximate to the outlet end to clamp the dough while the cutter cuts the dough; and
    a clamp actuator assembly coupled to the clamp and operable to intermittently clamp dough during cutting operation and release dough for advancing the dough between cutting operation.

7. The dough processing machine of claim 6 wherein the clamp comprises:
    first and second opposed clamping members movable in a first direction toward one another; and
    a power actuator, coupled to the clamping members and the controller, to drive the clamping members in the first direction in response to a clamp signal from the controller.

8. An indexer for moving dough between a dough processor and a dough cutter which executes cutting operations to cut the dough, the dough processor being driven by a driver, the indexer comprising:
    a first downwardly inclined, continuous conveyor having a movable conveying surface and operably supported relative to the dough processor to receive a continuous portion of the dough from the dough processor and carrying the dough along a downward dough travel path angled downwardly relative to a generally horizontal line;
    a motor coupled to the first continuous conveyor to drive the first continuous conveyor;
    a controller coupled to the motor and to the driver and providing a motor control signal to the motor to control the motor, the motor control signal controlling the motor to drive the first continuous conveyor between cutting operations and to stop the first continuous conveyor during cutting operation;

a first side support supported on a first side of the conveying surface of the first conveyor having a first movable support surface movable in a direction generally parallel to the downward dough travel path and being disposed relative to the first continuous conveyor to support a first side of the dough along the downward dough travel path; and a second side support supported on a second side of the conveying surface of the first conveyor spaced from the first side support and having a second movable support surface movable in a direction generally parallel to the downward dough travel path and being disposed relative to the first continuous conveyor to support a second side of the dough, generally opposite the first side of the dough, along the downward dough travel path.

9. The indexer of claim 8 wherein the controller is configured to receive a movement signal from the driver indicative of movement of the driver, and wherein the controller is configured to control the motor based on the movement signal.

10. The indexer of claim 9 and further comprising:
driving means, coupled to the first side support and the second side supports for driving the first and second side supports.

11. The indexer of claim 10 wherein the driving means comprises:
an assembly coupled to the motor and the first and second side supports.

12. The indexer of claim 10 wherein the driving means comprises:
a second motor coupled to the controller and the first and second side supports.

13. The indexer of claim 8 wherein the first and second side supports each comprise a continuous conveyor.

14. The indexer of claim 10 wherein the controller is coupled to the driving means to control the driving means and wherein the controller is configured to control the driving means and the motor to intermittently advance the dough along the dough travel path at a rate based on the movement signal to accommodate dough delivered by the dough processor.

15. The indexer of claim 8 and further comprising:
a clamp disposed proximate the cutter and the first continuous conveyor, and controllable by the controller to clamp the dough during cutting of the dough.

16. A food processing machine, comprising:
a first conveyor having an inlet end and an outlet end and having a movable conveying surface including a conveying portion configured to convey a continuous portion of food product along a food travel path in a direction downwardly offset from a generally horizontal line;

an infeed conveyor having a first and second end, the infeed conveyor and first conveyor being supported in end to end relation to convey a continuous elongated dough cylinder from the infeed conveyor to the first conveyor;

a cutter disposed at the outlet end of the first conveyor to execute cutting operations to cut the food product;

first and second generally opposed continuous support conveyors disposed on opposed sides of the conveying surface of the first conveyor relative to the food travel path to support the food product along the food travel path; and a controller coupled to the infeed conveyor, the first conveyor and the first and second support conveyors, the controller being configured to control the infeed conveyor at a substantially constant rate, and the controller being configured to control the first conveyor and the first and second support conveyors to convey the food product between cutting operations at a speed based on a speed of the infeed conveyor, and to stop conveying the food product during the cutting operations.

17. The food processing machine of claim 16 and further comprising:
a clamp coupled to the controller and disposed proximate the cutter and controllable by the controller to clamp the food product during cutting.

18. A processing machine for separating a continuous dough cylinder into separate pieces comprising:
a conveyor having movable endless unobstructed conveying surface to convey an extruded dough cylinder along a travel path;

a cutter operable coupled to the conveyor along the conveying surface to cut the extruded dough cylinder into separate pieces;

first and second cutting supports supported on opposed sides of the movable conveying surface proximate the cutter for maintaining the shape of the dough cylinder supported along the conveying surface proximate to the cutter, the first and second cutting supports including moveable support belts; and drive assembly operably coupled to the conveyor and first and second movable support belts and configured to synchronously intermittently operate the conveyor and first and second movable support belts.

* * * * *